(12) United States Patent
Gopalakrishnan

(10) Patent No.: US 8,645,329 B2
(45) Date of Patent: Feb. 4, 2014

(54) UNIFIED MODEL DESIGN FOR PENDING AND PRODUCTION INFORMATION AND VERSIONED INFORMATION

(75) Inventor: Prasanth Gopalakrishnan, Kerala (IN)

(73) Assignee: Oracle International Corporation, Redwood Shores, CA (US)

( * ) Notice: Subject to any disclaimer, the term of this patent is extended or adjusted under 35 U.S.C. 154(b) by 798 days.

(21) Appl. No.: 12/476,497

(22) Filed: Jun. 2, 2009

(65) Prior Publication Data

US 2010/0306172 A1 Dec. 2, 2010

(51) Int. Cl.
*G06F 7/00* (2006.01)
*G06F 17/00* (2006.01)

(52) U.S. Cl.
USPC .......................................................... 707/665

(58) Field of Classification Search
USPC ............................ 707/713, 717, 665, 999.102
See application file for complete search history.

(56) References Cited

U.S. PATENT DOCUMENTS

| | | | | |
|---|---|---|---|---|
| 2003/0088534 A1* | 5/2003 | Kalantar et al. | ................. | 706/50 |
| 2005/0044002 A1* | 2/2005 | Kwasniewski et al. | .......... | 705/26 |
| 2005/0086525 A1* | 4/2005 | Cirulli et al. | ................... | 713/201 |
| 2006/0235730 A1* | 10/2006 | Politano et al. | .................... | 705/4 |

* cited by examiner

*Primary Examiner* — Alexey Shmatov
(74) *Attorney, Agent, or Firm* — Kilpatrick Townsend & Stockton LLP

(57) ABSTRACT

A change management model-based approach can be used for managing information, such as rows of data, presenting merged information from a pending and/or production datastore with rule-based redirection to an appropriate pending and/or production datastore. Such a model can support versioning, leveraging the pending data storage; can provide for direct or merged views of the appropriate datastore; and can provide a model logic for production data updates, version updates, and/or for change context updates. A unified presentation and update model for change management can merge pending data over the production information based on the context, and allow updates on top of production/date effective versioned information. Based on various rules, the data can be pushed to production or to a change order in the context of either datastore or to a fresh change order itself.

14 Claims, 8 Drawing Sheets

| Action | ItemID | AG_ID | NumberData | CharacterData | Changed |
|---|---|---|---|---|---|
|  | 1 | 1 |  |  | N |
|  | 1 | 2 | 30 | testdata | N |
|  | 1 | 3 |  | data | N |

FIG. 3(a)

| Action | ItemID | AG_ID | NumberData | CharacterData | Changed |
|---|---|---|---|---|---|
|  | 1 | 1 |  |  | N |
| Update | 1 | 2 | ~~30~~ 130 | ~~testdata~~ testdata1 | Y |
|  | 1 | 3 |  | data | N |

FIG. 3(b)

| Action | ItemID | AG_ID | NumberData | CharacterData | Changed |
|---|---|---|---|---|---|
| Delete | 1 | 1 |  |  | Y |
| Update | 1 | 2 | ~~30~~ 130 | ~~testdata~~ testdata1 | Y |
|  | 1 | 3 |  | data | N |

FIG. 3(c)

| Action | ItemID | AG_ID | NumberData | CharacterData | Changed |
|---|---|---|---|---|---|
| Delete | 1 | 1 |  |  | Y |
| Update | 1 | 2 | ~~30~~ 130 | ~~testdata~~ testdata1 | Y |
| Update | 1 | 3 |  | ~~data~~ data1 | Y |
| Add | 1 | 4 | 2 | test | N |

FIG. 3(d)

| Action | ItemID | AG_ID | NumberData | CharacterData | Changed |
|---|---|---|---|---|---|
| Delete | 1 | 1 |  |  | Y |
| Update | 1 | 2 | ~~30~~ 130 | ~~testdata~~ testdata1 | Y |
| Delete | 1 | 3 |  | data | Y |
| Add | 1 | 4 | 2 | test | N |

FIG. 3(e)

| Action | ItemID | AG_ID | NumberData | CharacterData | Changed |
|---|---|---|---|---|---|
| Delete | 1 | 1 | | | Y |
| Update | 1 | 2 | 30 130 | testdata testdata1 | Y |
| | 1 | 3 | | data | N |
| Add | 1 | 4 | 2 | test | N |

FIG. 4(a)

| Action | ItemID | AG_ID | NumberData | CharacterData | Changed |
|---|---|---|---|---|---|
| Delete | 1 | 1 | | | Y |
| | 1 | 2 | 30 | testdata | N |
| | 1 | 3 | | data | N |
| Add | 1 | 4 | | | N |

FIG. 4(b)

| Action | ItemID | AG_ID | NumberData | CharacterData | Changed |
|---|---|---|---|---|---|
| Delete | 1 | 1 | | | Y |
| | 1 | 2 | 30 | testdata | N |
| | 1 | 3 | | data | N |

FIG. 4(c)

| Action | ItemID | AG_ID | NumberData | CharacterData | Changed |
|---|---|---|---|---|---|
| | 1 | 1 | | | N |
| | 1 | 2 | 30 | testdata | N |
| | 1 | 3 | | data | N |

FIG. 4(d)

| Action | ItemID | ID | NumberData | CharacterData | Changed |
|---|---|---|---|---|---|
| | 1 | 1 | | | N |
| Delete | 1 | 2 | 30 | testdata | Y |
| | 1 | 3 | | data | N |

FIG. 4(e)

| Automobile | ACDType | Price | Color | Transmission | Weight | Change bitmap |
|---|---|---|---|---|---|---|
| Production Database | | 10,000 | Red | Auto | 3,000 | 0000 |
| Pending Database | | null | null | null | null | |
| User Interface | | 10,000 | Red | Auto | 3,000 | |

FIG. 5(a)

| Automobile | ACDType | Price | Color | Transmission | Weight | Change bitmap |
|---|---|---|---|---|---|---|
| Production Database | | 10,000 | Red | Auto | 3,000 | 0100 |
| Pending Database | Update | null | Blue | null | null | |
| User Interface | | 10,000 | Blue ~~Red~~ | Auto | 3,000 | |

FIG. 5(b)

| Automobile | ACDType | Price | Color | Transmission | Weight | Change bitmap |
|---|---|---|---|---|---|---|
| Production Database | | 10,000 | Red | Auto | 3,000 | 0110 |
| Pending Database | Update | null | Green | Manual | null | |
| User Interface | | 10,000 | Green~~Red~~ | Manual | 3,000 | |

FIG. 5(c)

UNIFIED MODEL DESIGN FOR PENDING AND PRODUCTION INFORMATION AND VERSIONED INFORMATION

BACKGROUND OF THE INVENTION

Systems and methods in accordance with various embodiments relate to change management, and in particular various embodiments relate to providing a unified view model for pending and production information, and in some embodiments versioned information as well.

A common business need is to manage changes to the data that exists in a system. Users oftentimes want to request changes to production or other such data, and the changes only take effect after being approved. The change requests are typically stored separately from the production information. Based on the outcome of an approval process, which typically utilizes a separate interface, the changes in the requests will be committed to the production data, discarded, or otherwise processed. In conventional systems, production data and pending data are stored in separate tables and/or data stores, and separate model logic was used for each table. The user typically has to be aware of the type of modification to be performed, and perform tasks such as pre-planning changes, selecting a production row and the attributes to be changed, and making changes to attributes without actually seeing the other production information. Users should take the onus of creating the delta changes they want to perform.

BRIEF SUMMARY OF THE INVENTION

Systems and methods in accordance with various embodiments of the present disclosure can overcome these and other deficiencies in existing approaches to managing changes to information. Various embodiments utilize a unified model, wherein users see the current production data and go ahead with their changes as they would update the production directly. The system takes care of keeping the delta changes separate as the user goes on making changes and processing them accordingly.

In one embodiment, updates to stored data are managed by receiving a request to update stored data, and if updated data corresponding to the request does not require approval as per user-specified rules, the stored data is updated using the updated data. If instead the updated data falls under a certain change order (approval process) required rule, the updated data is stored as pending change data. A user can then select a pending view to be displayed that includes view data from both the stored production data and the pending delta change data. The stored data can be updated using the pending change data when the pending change data gets approved.

The storage of the pending change data can be directed according to at least one rule, and version information can be stored with each update of the data. The stored data can be stored across multiple datastores, while the pending change data can be stored in a virtual layer over the stored data across the multiple datastores. In certain implementations, the pending change data also can be stored in same storage as the production data itself, by specifying the context as pending change data.

Various other systems, methods, and program products for performing these and other functions are described with respect to the various embodiments.

A further understanding of the nature and the advantages of the inventions disclosed herein may be realized by reference of the remaining portions of the specification and the attached drawings.

BRIEF DESCRIPTION OF THE DRAWINGS

Various embodiments in accordance with the present invention will be described with reference to the drawings, in which:

FIGS. 3(a)-3(e) disclose an example of managing changes to production data and data view on user interface that can be used in accordance with one embodiment, where FIG. 3(a) shows initial production data and the following figures depict user actions such as updating, deleting, adding, or other such actions, along with corresponding change in a user interface;

FIGS. 4(a)-4(e) disclose an example of data presentation layer in pending context, with few existing changes and managing further changes to pending data and the changes to data presentation layer in accordance with user updates on a user interface in accordance with one embodiment;

FIGS. 5(a)-5(c) illustrates an example of data presentation layer in pending context and changes to the actual pending data getting stored in the database and data presentation layer on a user interface, in accordance with user updates on the user interface;

DETAILED DESCRIPTION OF THE INVENTION

Figure 1A:
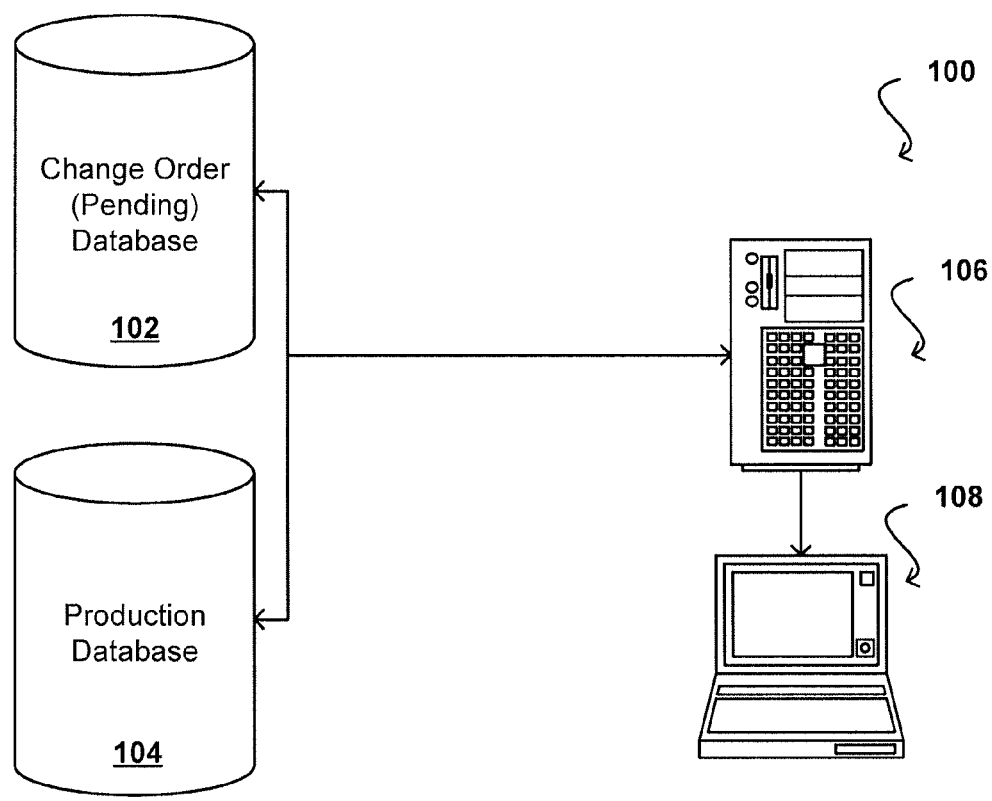
FIGS. 1(a)-1(b) illustrate components of a computer network that can be used in accordance with one embodiment.

Systems and methods in accordance with various embodiments overcome the aforementioned and other deficiencies in existing approaches to the management of changes to data and other information. Embodiments take advantage of a change management model-based approach to creating, updating, and/or deleting information, such as rows of entity data, for example, while providing for a presentation of merged information from a pending and/or production datastore with rule-based redirection to an appropriate pending and/or production datastore. Embodiments also can support versioning and versioning updates, leveraging the pending data storage. Further, embodiments allow provide for direct and/or merged views of the appropriate datastore. Embodiments further provide model logic that can be used for production data updates, version updates, and/or for change context updates.

Embodiments described herein can be used with a Model View Controller (MVC) or similar architecture, utilizing a unified model layer design for pending, production, version, and other such updates. An MVC architecture generally provides for the isolation of a user interface layer from business logic or other underlying layers, such that aspects such as the visual appearance or business rules can be modified without affecting components of the other layers. The controller aspect of the MVC architecture manages business rules and data communication for the model. The model is generally a domain-specific representation of the application data, with the view portion able to render the model as part of a user interface. The interface can consist of multiple views of the model.

Embodiments provide model designs with a unified presentation and update model for production information and change management of production information. The new model can merge pending data under change management over the production information based on the context and allow updates on top of production information. Based on various rules, such as may be defined by a customer, user, or other source, the data can be pushed to production or to a change order. A user can choose to add to an existing change order or to a fresh change order itself, and the changes will be added in the change order as a Revised Item. As an example, if the increase in the price of an item is more than 10%, the change may have to be pushed to a change order and have to go through change approvals before the change can go to production. But if it is less than 10%, the change may go directly to the production. In case the rules suggest that the information can be stored in the production datastore, then the information will be delegated to the production datastore and will be immediately visible in the production datastore.

A Rule Admin user can setup various types of rules that indicate to the system that the changes require a change order (i.e., a change should go through approval before getting to production). For example, rules could be set up like the following:

1. if (A+B−C>20) requires a change order (whenever A, B or C is changed the rule is triggered)
2. if (A>B) requires change order
3. if (A.OldValue>A.NewValue) requires change order Also, assignment rules such as A=B+C/2 can be used. Whenever B or C is updated in this case, A will be assigned a value based on the rule. These assignment rules also might trigger the Change Order Required rules. When a user hits the save button to commit the changes, in case any change requires a change order then a change creation/add to existing change order popup can be opened and only the changes requiring a change order and its related changes under the change order can be pushed, with the rest being saved in the production itself. If the user is actually, in the context of the change order, editing changes under the revised item, by default the change order required rules can be ignored as the change is already made in the context of a Change Order. From production, the user may also manually click the "Add to Change Order" button if the user decides to push all the changes to a change order irrespective of what the system defined rules decide.

Embodiments remove the need for multiple user interfaces to be generated for production and pending information updating and creation, as both can now be based on the same model layer and such a single unified approach for updating production and pending information is more user friendly. When a user wants to update the pending changes, the user is provided with production data merged with pending data in the change context and the user can update the pending information just as the user updates the production information. This way, much context information is available to the user since all the rows, and not just the row to be modified, are made available or displayed. Such an approach desirably reduces the need for planning activity and is more user friendly in comparison to the conventional user interface for pending and production updates, as they are conventionally very different. Also, users are no longer required to be trained to use multiple user interfaces for updating production and pending data. In addition, automated redirection of only the information requiring change management to an appropriate change order may be provided, thus providing automation and fine level control.

Versioning can also be supported by this unified model design. A versioning framework in accordance with one embodiment allows users to make delta changes effective as of a particular date. Such an approach allows users to create versions with "effectivities" defined, and then make changes to data that will be effective as of that future date. Past versions can also present a history of changes to the data over a period of time. A versioning implementation is similar to the change in terms of delta storage and implementation on effectivity. Also, versions can be pushed to change orders for approval, in which case the version will be available for effectivity on a future date based on the approval outcome.

Embodiments are presented in the context of change management functionality of product information, however, it will be appreciated that the context may vary without departing from the basic concepts as disclosed herein. For example, users may sometimes implement changes in the production database only after the change goes through an approval process. Change management allows users to make pending changes on top of production information and store the changes separately from the production information.

Figure 1B:
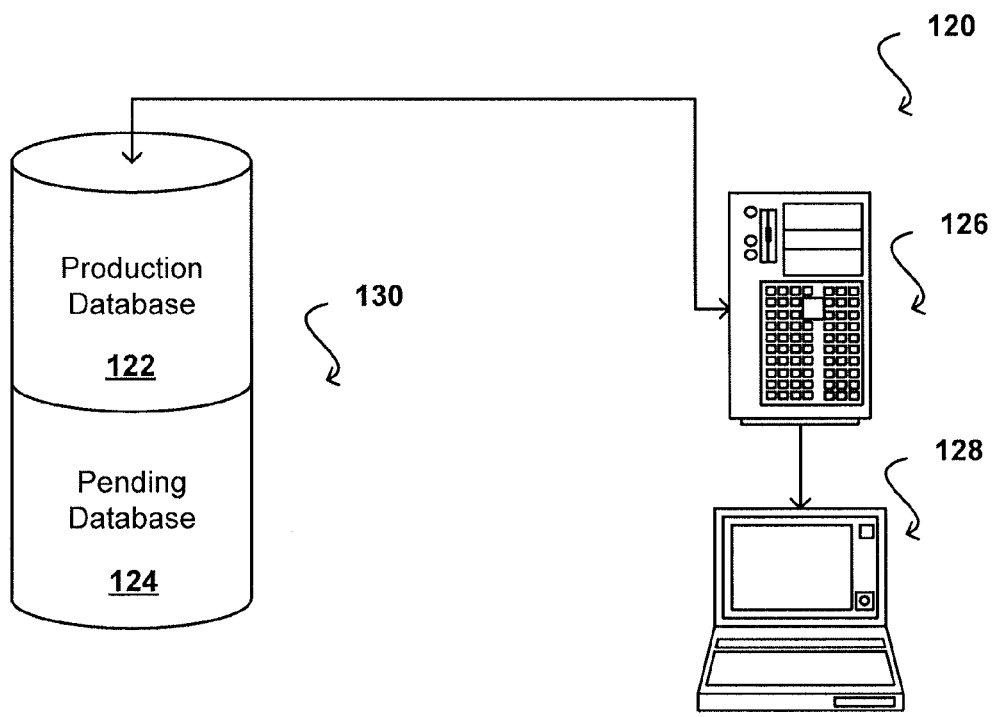

FIGS. 1(a)-1(b) illustrate components of a computer system 100 and 120 that can be used in accordance with one embodiment. Referring to FIG. 1(a), production data may be stored in a production database 104 separately from data stored in a change order (pending) database 102. The pending database 102 may store data related to changes requested to be made to the production data in the production database 104. Such databases are often separate and the data contained within each database is conventionally viewed separately. Alternatively, they may lie in same database in separate tables or in the same table itself with a discriminator column, which determines whether the table row data corresponds to production data or pending changes. However, various embodiments allow for the viewing of both databases simultaneously. For example, a server 106 may have access to both databases and may provide the data of both databases to a user of device 108. Alternatively, as illustrated and shown in FIG. 1(b), a single database 130 may contain both the production 122 and pending data 124, with a server 126 having access to the database 130 and providing the data to a user of device 128. Various embodiments may be used with these and other configurations. Ultimately, a unified model for viewing production/pending data and their associated data versions is provided, irrespective of whether separate data storages are used. However, for reporting purposes if it is desired to show only the delta changes in the pending context, this can still be easily achieved since only delta changes are stored in the database. Also the storage requirements are kept minimal since only rows with delta changes are committed to the database, and only attributes having changes take up storage space most of the time.

Such databases may be used, for example, to represent product information. A certain product may have various attributes associated with it and these attributes may need to be modified from time to time. For instance, a user of a device 108 may access and modify information stored in a production database 104 through, for example, a database server 106. In some embodiments, a change to an attribute may be made directly to the production database 104. However, in various embodiments, a change to an attribute may not be made directly as it would first require approval by appropriate entities. In some embodiments, a change to an attribute may be made as long as the change is minor, but would require authorization otherwise. For example, if the product is an automobile tire and an associated attribute is the list price of the tire, the list price of the tire may be modified. If a requested change in the list price of the tire is sufficiently minor, say less than 10%, then the change may be directly committed to the production database 104 without approval. If the requested change in list price is beyond a certain threshold, say more than 10%, then the requested change must first reside in change order database 102 before it can be pushed to the production database 104 following approval. Also, customers may use Change Orders in cases where a customer wants to track the history of changes for future reference. The unified model allows the approvers to look at the change data in the context of production, just like it would look if the delta changes were approved and implemented as of that day. Also, a separate reporting view can list only the delta changes, thus aiding easy decision-making.

Figure 2:
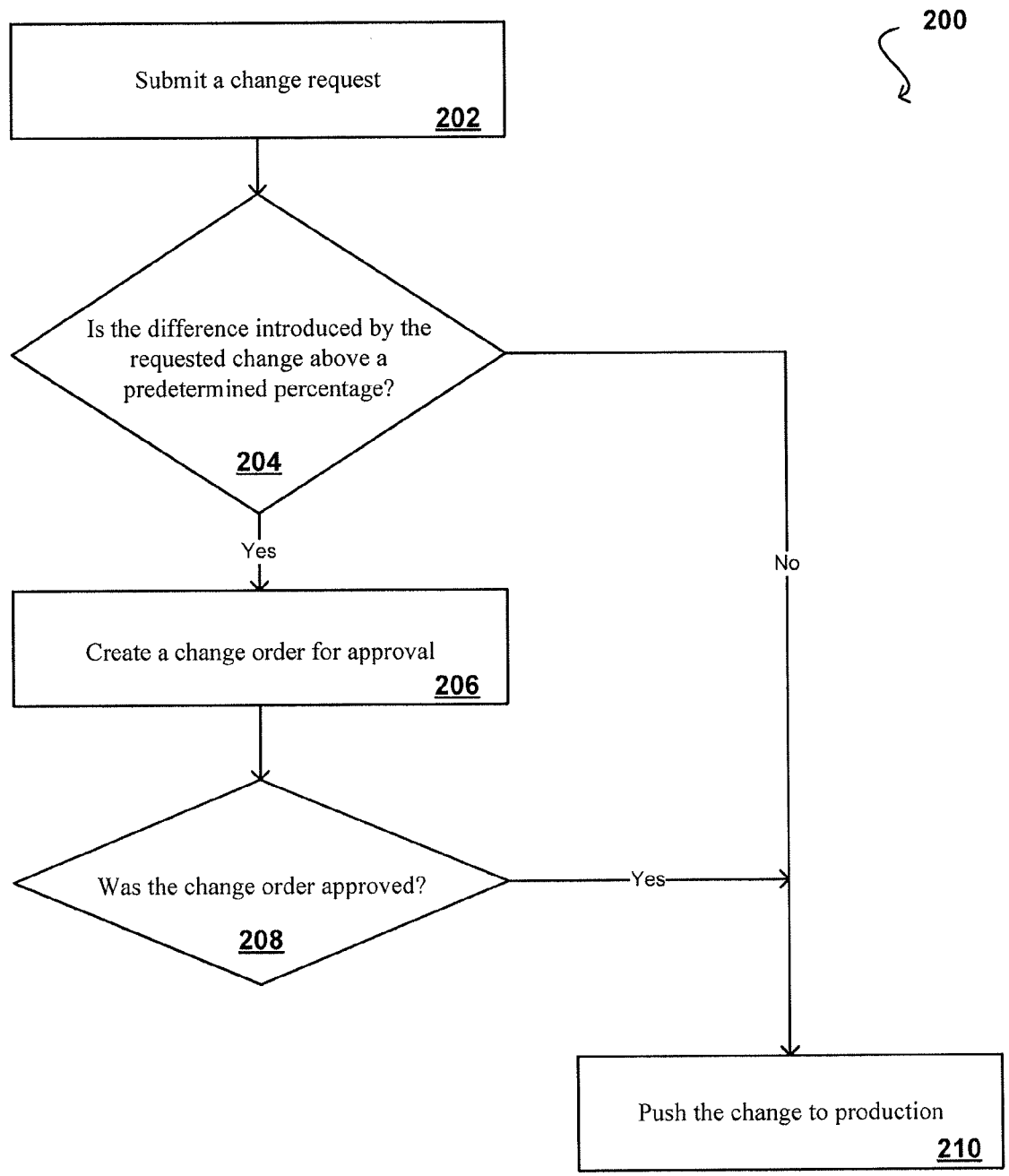
FIG. 2 illustrates an exemplary method for managing changes that can be used in accordance with one embodiment.

FIG. 2 illustrates an exemplary method for managing changes that can be used in accordance with one embodiment. As shown in FIG. 2, a change to a database value is requested 202. In some cases a user will formally go through a change request to change order process, while in other cases the user may choose to make direct updates on the production data. If the difference introduced by the requested change is not above a predetermined percentage 204, the change is pushed to the production database 210. As discussed above, a Rule Admin user can setup various types of rules telling the system that the changes require a change order. If the difference introduced by the requested change is above a predetermined percentage 204, a change order is created for approval 206. If the change order is approved 208, then the change is pushed to the production database 210.

It will be appreciated that the embodiments described herein are illustrative and that variations and modifications are possible. For example, an approval may be required if the list price is requested to be decreased by more than 10%, but an approval may not be required if the list price is requested to be increased by more than 10%. As another example, one attribute like the list price may require approval beyond a 10% change, while a different attribute like the tire's warranty lifetime may require approval beyond a 5% change. Rules can be defined by a framework which can interpret the logical/mathematical statements and/or validations and perform the validations and assignments on the data presented to it. Rules can be effective on all data that is modified by the user directly or assigned by rules.

FIGS. 3(*a*)-3(*e*) disclose an example of data in a change management database that can be used in accordance with one embodiment. In some conventional change management systems, a change may be first made by a user to the change order using a user interface separate from the normal user interface user for updating directly in production. In a pending context, a user has to create the delta rows and the information would be saved as it is. The system is not intelligent enough to allow the user to make updates in a production context and to separate out the delta changes. At a later time when the change is implemented after approval, the delta changes may be committed on top of the production data as a back end process. However, in the current embodiments, a user may submit such changes using the same production user interface that can represent the pending data in the context of production or version data in the context of other versions or the production data. For example, in relation to FIG. 1(*a*), a database server 106 may provide access to a device 108 in such a way that a pending database 102 and a production database 104 appear to be combined. In other words, the interface provided to a user of device 108 may show the user a single view that could represent either one or more underlying data sources. This is beneficial as a user need only learn a single interface and since maintenance and support of the system may be simplified.

As a non-limiting example, FIG. 3(*a*) illustrates a view of data in a production database that may be provided to a user. The data shown is currently in the production database and therefore no changes are pending. Accordingly, the Action (also referred to as the Add/Change/Delete Type or ACD-Type, having the same meaning) row is empty. The table includes an Attribute Group ID (AG_ID, an identifier uniquely identifying the attribute group represented by the row, with an attribute group including attributes that are related and can be internally stored together as a single row in the corresponding table) column that may be used to identify and distinguish rows. For simplicity, other primary keys used to support multi-row attribute groups are not included. The table also includes few attributes such as: a NumberData and CharacterData column, which in this example may be used to represent number values and character values, respectively. In an implementation there may be many attributes of various data types in the table row. The table additionally includes a column named Changed which can be used to indicate whether any modification has been requested or pending. This column may contain a Boolean value, for instance, a 0/1, True/False, or Yes/No value. In FIG. 3(*a*), the Changed column for every row contains a value of "N" (representing a 0/False/No value) since no values in any row contain a pending change. In one implementation a bitmap concept having "1s" for attributes which were changed and "0s" for attributes which were not changed can be used. If all bitmaps are 0 then no deltas are present. If a bit at location N is 1, that would mean the attribute N has been modified.

As shown and described in FIG. 3(*b*), a user may request that the NumberData and CharacterData values for row ID2 be changed. The user may be shown the old (production database) and new (pending database) values simultaneously. For example, the old and new values can be displayed by utilizing a redlining approach where the marking of changes is shown by underlining added content and striking out deleted content. More specifically, as shown in FIG. 3(*b*), the NumberData value may be shown to be changed by an existing value of "30" being stricken and replaced by a new value of "130" by underlining. The change management system may track this change by setting the Changed value for this row to "Y" (representing a 1/True/Yes value) to indicate that this row includes a pending change. The ACDType (Add/Change/Delete Type) value is also changed to "Update" to indicate the type of change that has been made to this row.

Other operations are also possible. For instance, FIG. 3(*c*) shows that a request has been made to delete row ID1. Accordingly, the Changed value has been updated to "Y" since a change has been requested for this row and the ACDType value for this row has been changed to a value of "Delete" to indicate that the requested change is the deletion of the row. The values of the other two rows remain unchanged. FIG. 3D illustrates that a change has been requested to row ID3, namely that the CharacterData value be modified. Accordingly, the change is shown in a redlining fashion, the Changed value is updated to "Y," and the ACDType is updated to "Update." FIG. 3(*d*) also shows that a request to add a new row has been made. The new row receives an ID of "4" and it's NumberData and CharacterData fields may be populated. In addition, the ACDType value of row ID4 (the newly added row) contains a value of "Add" to indicate that this row is to be created and added to the production database. However, in this example, the Changed value receives a value of "N" since no change has been made from a previous version, but instead the row is newly added. It will be appreciated that variations exist in versioning policy. For example, new row ID4 may have received a value of "Y" in it's Changed field to indicate that this row is new and the user has made some changes.

FIG. 3(e) illustrates the effect of a deletion operation on a row containing a pending change. In some embodiments, if a user requests the deletion of a row with a pending change, the pending change will be removed. For example, in FIG. 3(e), the CharacterData field of row ID3 reverts to the original data since the previously pending change is now irrelevant and the data is cleared from the pending row so that the old data gets presented to the user from the reference row (in this scenario the production data). However, the Changed field of row ID3 remains as "Y" since a change, namely a deletion, is still requested for the row. Accordingly, the ACDType field of row ID3 is set to "Delete." At this point, the pending changes may be submitted to the change management system. The changes may be directly committed to the production database. Alternatively, some or all of the changes may first require approval before they are committed to the production database.

FIGS. 4(a)-4(e) disclose an example of data in a change management database that can be used in accordance with one embodiment. The transition between FIG. 4(a) and FIG. 4(b) illustrates the removal of pending changes to the production database, namely changes that were made to NumberData and CharacterData fields. As shown in FIG. 4(b), row ID2's pending changes are removed and the redlining of the values has disappeared. Since the row has been returned to it's original state, the Changed field returns to a value of "N" and the ACDType field is empty or null. The transition between FIG. 4(b) and FIG. 4(c) illustrates the removal of pending changes to the production database, namely the addition of row ID4. As shown in FIG. 4(c), row ID4 has been completely removed. In this embodiment, there is no need to continue displaying row ID4 since it was not part of the original production data. However, row ID1, even though requested to be deleted, is still displayed since pre-exists in the production data. In FIG. 4(d), the request for the deletion of row ID1 is removed and the Changed field returns to a value of "N" since the row has been returned to it's original state. FIG. 4(e) shows that a row may be modified multiple times before a request for a change is submitted. As shown through FIGS. 4(a)-4(e), a request was originally made to update row ID2, the update request was later removed, and finally a delete operation was requested. These changes were all made before the requested changes were submitted.

It will be appreciated that the embodiments described herein are illustrative and that variations and modifications are possible. For example, changes between the production data and the pending data may be shown by a method other than redlining, for instance, where added content is indicated by blue text and deleted content is indicated by red text.

FIGS. 5(a)-5(c) disclose an example of managing changes to data and a data view that can be used in accordance with one embodiment. FIGS. 5(a)-5(c) show the values stored in both a production database and a pending database for a specific item. For example, FIGS. 5(a)-5(c) could represent the production and pending rows that exist "behind" each item or row in FIGS. 3(a)-3(e) and 4(a)-4(e).

In the example of FIG. 5(a), the values are attributes related to an automobile, for instance, the price, color, transmission, and weight of an automobile are stored. The production database may contain original data that had been submitted when the item was initially created or data that may have been modified, approved, and committed after the item was initially created. Since no changes are pending at this stage, the pending database contains null values for all of the automobile attributes being shown. A user interface row indicates which values from the two databases may be displayed to a user. The user interface row of FIG. 5(a) displays the same values that are stored in the production database since no pending changes exist. The pending row can act as a "layer" between the data stored in the production database and the data displayed by the user interface. A change bitmap value is stored which can be used to track any changes that are being requested. The change bitmap may contain multiple bits that are used to indicated whether a pending change for a certain attribute exists. In FIG. 5(a), every bit in the change bitmap is set to a value of "0" to indicate that no pending changes exist. The virtual layer in one embodiment can be thought of as a transparent sheet placed over the actual data. A user can strike out the actual data and enter new data. This is the type feel the user would get out of the user interface. The implementation in at least one embodiment is similar, as the virtual layer refers to the values of the attributes with a change bitmap as '0' from the reference row, which is like the actual data that lies beneath the transparent sheet in the analogy. If the virtual/pending row has some data or the bitmap is set to '1' then it would return the value instead of the reference value. Also, the delta would be captured only if the user enters a value other than the reference value. This also ensures a minimum storage requirement. If there are no attributes with bit set as 1, the entire row is not committed to database, thus reducing the data storage requirement further. An ACDType column indicates the type of change that may be requested. As no changes have yet been requested in the current example, the ACDType column is empty.

FIG. 5(b) illustrates the effect of an update operation on an attribute of the item. A request is made to modify the color attribute of the item, here updating the color of the car to blue. Accordingly, the ACDType (or Action) column of the pending database layer is set to an "Update" value to indicate that a pending change exists for the item. The change bitmap column is also updated in order to indicate which attribute of the item has been modified. Particularly, the bit in the change bitmap that represents the color attribute is set to a value of "1." The user interface display row is also updated to show a combination of the production and pending database contents. More specifically, the user interface shows the future state of the production database if the currently pending changes were committed. The view provided by the user interface may be similar to the redlining view discussed above in order to display both the production and pending values.

FIG. 5(c) illustrates the effects of subsequent updates to the attributes of the item. The color attribute of the item is once again changed to a different value. The bit representing the color attribute in the change bitmap remains the same value of "1" since a change request still exists. The transmission attribute of the item is also modified and the corresponding change bitmap is updated to track this change in addition to the previous change made to the color attribute. The view provided by the user interface is updated to display the unchanged attributes of the production data with the requested changes. If the changes in FIG. 5(b) or 5(c) or submitted, some or all of the requested changes may require approval before the production database is updated with the requested changes. If none of the requested changes are approved, the pending database layer may be eliminated by deletion or may be canceled, by performing the corresponding action on the Revised Item or the Change Order itself. In other words, all of the attributes in the pending database layer may be set back to a null value.

The user interface provided to the user in a variety of forms which include but are not limited to a webpage, a dedicated application, or a textual interface. The user interface may include additional functionality. For example, if a change is submitted that cannot be made since it would first require approval, instead of displaying an error message as conventional systems, a popup message may be shown. The popup message allows the user to choose an existing change order or to create a new change order, and the changed rows requiring change management as per the rules can be pushed to the change order automatically. The design gives flexibility for the application to selectively send the delta change rows to change and commit the changes, not requiring a change order to be saved directly to the production environment.

It will be appreciated that the embodiments described herein are illustrative and that variations and modifications are possible. For example, the absence of a pending change in the pending database may be indicated by a value other than a null value. The bits in the change bitmap may not be binary, but instead may be a decimal value. This value may be used to count the amount of changes made to a certain attribute. The change bitmap also helps to track a history of changes, and helps in showing changes as redlined. A change bitmap can even allow the user's intention to null out an attribute to be captured by storing a bit as 1 and a value as null. The pending changes may be removed by the requesting user and/or an approving user.

Figure 6A:
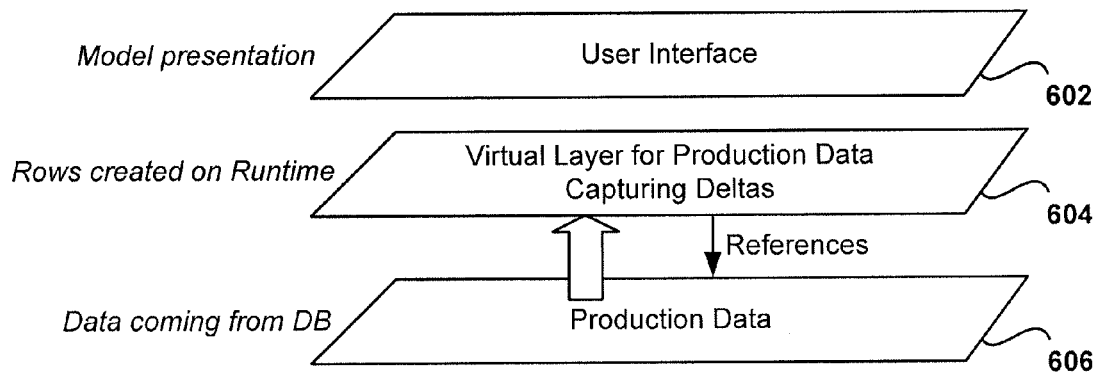
FIGS. 6(a)-6(c) illustrate logic diagrams for various update scenarios in accordance with one embodiment.
Figure 6B:
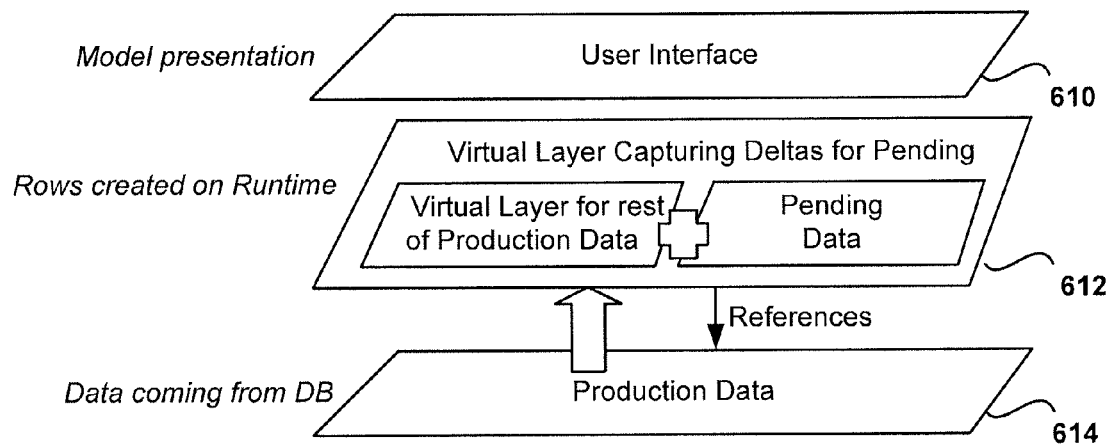
Figure 6C:
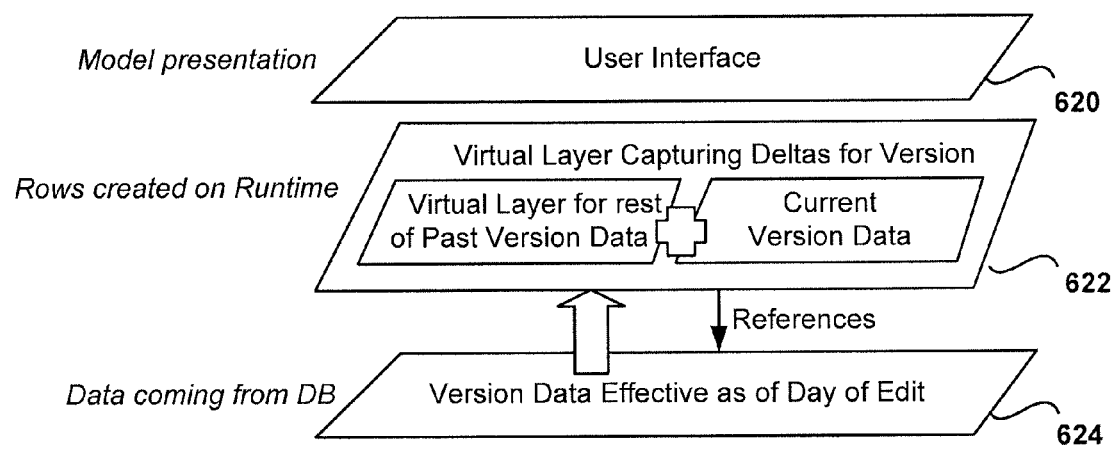

FIGS. 6(a)-6(c) illustrate logic diagrams for various update scenarios. For example, FIG. 6(a) illustrates a production update scenario including a user interface layer 602, a virtual layer for production data capturing deltas 604, and a production data layer 606. The virtual layer 604 corresponds to rows created on the runtime or any existing pending rows in case the data is being queried in pending context, while the production data layer 606 represents data coming from the database. The virtual layer in this scenario stores only deltas and references the production data to complete itself. All deltas requiring a change order will be stamped with the change context and the rest of the deltas will be applied on top of the production data to which it refers, and deltas will not be committed to the database. Also, any updates done directly from change/version context would carry the corresponding stamp by default.

FIG. 6(b) illustrates a pending update scenario including user interface 610 and production data 614 layers, along with an intermediate virtual layer 612 capturing deltas for pending updates. As can be seen, the virtual layer includes a virtual layer for the rest of the production data as well as the pending data. The virtual layer is committed to the database only if any delta changes are carried as well, otherwise they are ignored.

FIG. 6(c) illustrates a version update scenario including user interface 620 and version data 624 layers (effective as of the day of the edit), along with an intermediate virtual layer 622 capturing deltas for version information. As can be seen, the virtual layer includes a virtual layer for the rest of the past version data as well as the current version data. The virtual layer in this scenario always stores only deltas and references version data effective as of just prior to the current version's start data to complete itself.

An example of presentation logic implementation follows. A first step may include querying pending information, if any, and querying the corresponding production row (for ACDType update/delete). For an add case, there won't be any corresponding production row as that row has not yet been added to production. A second step may include querying all production rows from the database and comparing the production row's key with the pending information that has already been queried. If there is no matching row already existing, a corresponding dummy row with an ACDType of "Update" in the ViewObject with a change bitmap value set as "0" may be created, thus getting the production data based on the following logic.

An example of merging pending and production information follows. Since a pending row may only contain values for fields that have been requested to be changed in the production rows, the difference information the rest of the information is obtained from the corresponding production row if one exists. The change in information stored in a pending row will be represented by a change bitmap which stores a value of "1" for changed attributes and a value of "0" for unchanged attributes. The logic for merging production data is implemented by overriding the model framework method that fetches the attribute value (such as a method called getAttributeInternal(int baseIndex)) to return the attribute value (referenceRow.getAttribute(attributeName)) for every attribute with a change bitmap set as zero. Thus, a user interface and any validation logic on Entity and ViewObjects may be presented with the merged data whereas the actual entity does not have the production information stored. The validation logic can be reused for production, pending, versioning, and other such scenarios as the completed data set is presented to the validation APIs. Thus, the validation logic remains simpler as it does not need to be complex to handle the cases of delta changes alone, without the context. Also, the framework attribute setter method (e.g, setAttributeInternal) would be overridden to set the attribute value on the virtual row only if the value is different from the reference value, and to set the bit corresponding to the attribute to '1' in this case or reset the corresponding bit.

An approach in accordance with another embodiment can further abstract away differences in the various different validation scenarios. For example, the appropriate data sets for validations can be returned based at least in part upon information such as whether the context is for a change order, production, or a version.

Examples of data manipulation logic follow. For ACDType determination logic, an add action always creates a new row with an ACDType of "Add." When the current ACDType is "Update," an update action sets the change bitmap corresponding to the attribute, which in turn sets updated flag, a delete action sets ACDType as "Delete," clears any pending changes, and resets all change bitmaps. When the current ACDType is "Delete," an update action is not allowed on rows with ACDType "Delete" and a delete action sets ACDType back to "Update" and ensures that change bitmaps are all reset. When the current ACDType is "Add," an update action sets the change bitmap corresponding to the attribute, which in turn sets updated flag, a delete action deletes the row, and the change may be committed by commit logic.

Examples of pending data storage logic follow. When the ACDType is "Update," the row will be stored only if the changed flag is set to true. If the row was queried initially from the pending datastore, then a delete operation will be performed to delete the existing row as it is not required. When the ACDType is "Delete," the row is stored to the datastore with ACDType "Delete." This row is stored so that it can delete the corresponding production row during implementation. When the ACDType is "Add," the row is stored to the datastore with ACDType "Add." This row is stored so that it can add the corresponding production row during implementation.

Examples of production data storage logic follow. When the ACDType is "Update," if the changed flag is set to true, the corresponding production row will be updated with the changes and will be stored. When the ACDType is "Delete," the corresponding production row will be deleted and the current row will be deleted. When the ACDType is "Add," the corresponding production row will be created and the current row ACDType will be changed to "Update."

If a user is making updates in a change context, all of the changes will be pushed to the pending datastore. However, if the user is making the updates in the context of the production datastore, then the rules will be invoked from the validate entity. The rules in this context could be defined as any implementation of rules and the invocation could be added to the validate entity logic. Based on the outcome, the datastore could be decided. If the datastore is decided as a pending datastore, then the doDML will perform appropriate actions on the underlying pending datastore as mentioned in the pending data storage logic. In case the data has must be pushed to the production datastore, the update/delete/insert actions will be delegated to the corresponding production row based on the production data storage logic mentioned above and the doDML of the current entity will be blocked. The implementation logic of pending data is similar to the production datastore update logic except that the ACDType of pending rows will not be affected and that none of the pending rows will get removed, rather marked with ACDType "Delete". The merged information of production and pending datastores will be stored as the pending row for the purpose of maintaining a history.

Once approval of the pending changes are done, the changes can be implemented. The implementation process takes the back up of production for history purposes and then applies the delta on top of the production for update cases, creates new rows for add cases, and deletes production rows for delete ACDType. The implementation process is generally run as a background concurrent process and will push the pending changes to production and revalidate the production with pending changes. The implementation process may also fail in case the validation rules fail due to some invalid data.

Figure 7:
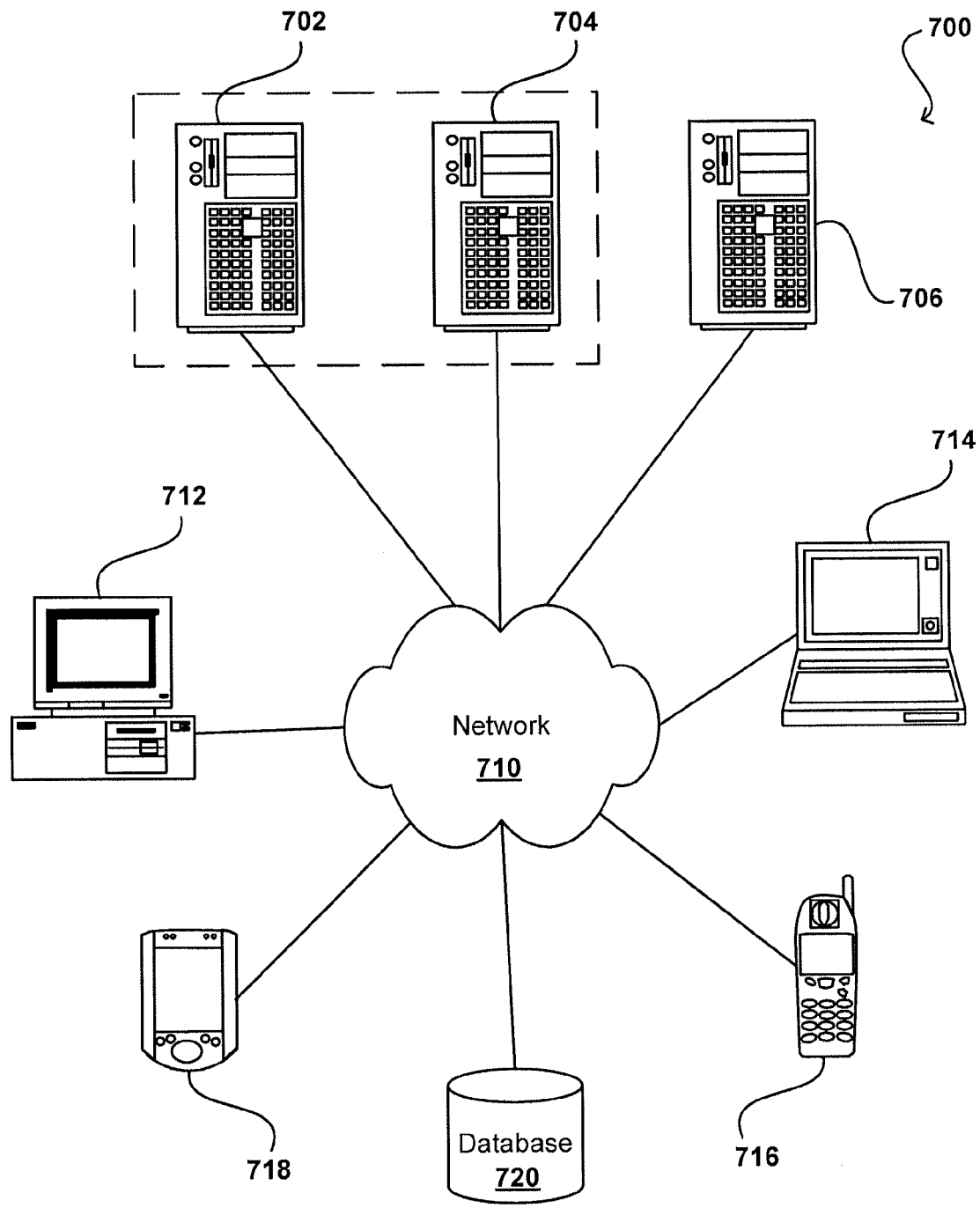
FIG. 7 illustrates components of a computer network that can be used in accordance with one embodiment.

Operating Environment:

FIG. 7 is a block diagram illustrating components of an exemplary operating environment in which various embodiments may be implemented. The system 700 can include one or more user computers, computing devices, or processing devices 712, 714, 716, 718, which can be used to operate a client, such as a dedicated application, web browser, etc. The user computers 712, 714, 716, 718 can be general purpose personal computers (including, merely by way of example, personal computers and/or laptop computers running a standard operating system), cell phones or PDAs (running mobile software and being Internet, e-mail, SMS, Blackberry, or other communication protocol enabled), and/or workstation computers running any of a variety of commercially-available UNIX or UNIX-like operating systems (including without limitation, the variety of GNU/Linux operating systems). These user computers 712, 714, 716, 718 may also have any of a variety of applications, including one or more development systems, database client and/or server applications, and Web browser applications. Alternatively, the user computers 712, 714, 716, 718 may be any other electronic device, such as a thin-client computer, Internet-enabled gaming system, and/or personal messaging device, capable of communicating via a network (e.g., the network 710 described below) and/or displaying and navigating Web pages or other types of electronic documents. Although the exemplary system 700 is shown with four user computers, any number of user computers may be supported.

In most embodiments, the system 700 includes some type of network 710. The network may can be any type of network familiar to those skilled in the art that can support data communications using any of a variety of commercially-available protocols, including without limitation TCP/IP, SNA, IPX, AppleTalk, and the like. Merely by way of example, the network 710 can be a local area network ("LAN"), such as an Ethernet network, a Token-Ring network and/or the like; a wide-area network; a virtual network, including without limitation a virtual private network ("VPN"); the Internet; an intranet; an extranet; a public switched telephone network ("PSTN"); an infra-red network; a wireless network (e.g., a network operating under any of the IEEE 802.11 suite of protocols, GRPS, GSM, UMTS, EDGE, 2G, 2.5G, 3G, 4G, Wimax, WiFi, CDMA 2000, WCDMA, the Bluetooth protocol known in the art, and/or any other wireless protocol); and/or any combination of these and/or other networks.

The system may also include one or more server computers 702, 704, 706 which can be general purpose computers, specialized server computers (including, merely by way of example, PC servers, UNIX servers, mid-range servers, mainframe computers rack-mounted servers, etc.), server farms, server clusters, or any other appropriate arrangement and/or combination. One or more of the servers (e.g., 706) may be dedicated to running applications, such as a business application, a Web server, application server, etc. Such servers may be used to process requests from user computers 712, 714, 716, 718. The applications can also include any number of applications for controlling access to resources of the servers 702, 704, 706.

The Web server can be running an operating system including any of those discussed above, as well as any commercially-available server operating systems. The Web server can also run any of a variety of server applications and/or mid-tier applications, including HTTP servers, FTP servers, CGI servers, database servers, Java servers, business applications, and the like. The server(s) also may be one or more computers which can be capable of executing programs or scripts in response to the user computers 712, 714, 716, 718. As one example, a server may execute one or more Web applications. The Web application may be implemented as one or more scripts or programs written in any programming language, such as Java®, C, C# or C++, and/or any scripting language, such as Perl, Python, or TCL, as well as combinations of any programming/scripting languages. The server(s) may also include database servers, including without limitation those commercially available from Oracle®, Microsoft®, Sybase®, IBM® and the like, which can process requests from database clients running on a user computer 712, 714, 716, 718.

The system 700 may also include one or more databases 720. The database(s) 720 may reside in a variety of locations. By way of example, a database 720 may reside on a storage medium local to (and/or resident in) one or more of the computers 702, 704, 706, 712, 714, 716, 718. Alternatively, it may be remote from any or all of the computers 702, 704, 706, 712, 714, 716, 718, and/or in communication (e.g., via the network 710) with one or more of these. In a particular set of embodiments, the database 720 may reside in a storage-area network ("SAN") familiar to those skilled in the art. Similarly, any necessary files for performing the functions attributed to the computers 702, 704, 706, 712, 714, 716, 718 may be stored locally on the respective computer and/or remotely, as appropriate. In one set of embodiments, the database 720 may be a relational database, such as Oracle 10g, that is adapted to store, update, and retrieve data in response to SQL-formatted commands.

Figure 8:
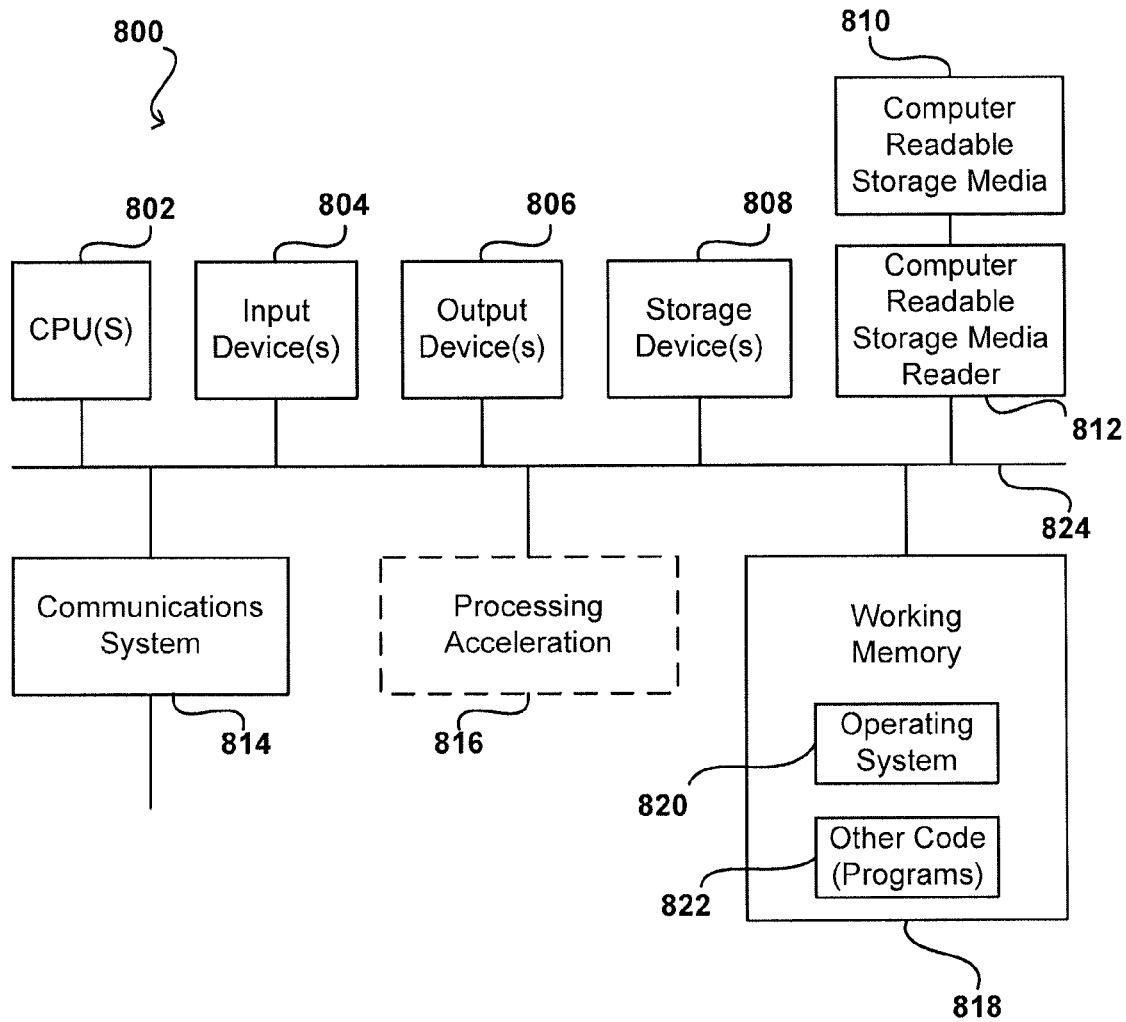
FIG. 8 illustrates components of a computerized device that can be used in accordance with one embodiment.

FIG. 8 illustrates an exemplary computer system 800, in which various embodiments may be implemented. The system 800 may be used to implement any of the computer systems described above. The computer system 800 is shown comprising hardware elements that may be electrically coupled via a bus 824. The hardware elements may include one or more central processing units (CPUs) 802, one or more input devices 804 (e.g., a mouse, a keyboard, etc.), and one or more output devices 806 (e.g., a display device, a printer, etc.). The computer system 800 may also include one or more storage devices 808. By way of example, the storage device(s) 808 can include devices such as disk drives, optical storage devices, solid-state storage device such as a random access memory ("RAM") and/or a read-only memory ("ROM"), which can be programmable, flash-updateable and/or the like.

The computer system 800 may additionally include a computer-readable storage media reader 812, a communications system 814 (e.g., a modem, a network card (wireless or wired), an infra-red communication device, etc.), and working memory 818, which may include RAM and ROM devices as described above. In some embodiments, the computer system 800 may also include a processing acceleration unit 816, which can include a digital signal processor DSP, a special-purpose processor, and/or the like.

The computer-readable storage media reader 812 can further be connected to a computer-readable storage medium 810, together (and, optionally, in combination with storage device(s) 808) comprehensively representing remote, local, fixed, and/or removable storage devices plus storage media for temporarily and/or more permanently containing, storing, transmitting, and retrieving computer-readable information. The communications system 814 may permit data to be exchanged with the network and/or any other computer described above with respect to the system 800.

The computer system 800 may also comprise software elements, shown as being currently located within a working memory 818, including an operating system 820 and/or other code 822, such as an application program (which may be a client application, Web browser, mid-tier application, RDBMS, etc.). It should be appreciated that alternate embodiments of a computer system 800 may have numerous variations from that described above. For example, customized hardware might also be used and/or particular elements might be implemented in hardware, software (including portable software, such as applets), or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices, data signals, data transmissions, or any other medium which can be used to store or transmit the desired information and which can be accessed by the computer. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A computer-implemented method for managing updates to stored data, the method comprising:

receiving, at one or more computer systems, a request to update data stored in a first database via a user interface generated using a model view controller configured to present a first view of production data stored in the first database;

updating, with one or more processors associated with the one or more computer systems, the data stored in the first database using updated data corresponding to the request in response to applying the updated data to the production data in the first database when the model view controller determines that a change to the data stored in the first database by the updated data does not require approval;

storing, with the one or more processors associated with the one or more computer systems, a difference between the updated data and the data stored in the first database as pending change data in a second database when the model view controller determines that a change to the data stored in the first database by the updated data does require approval;

receiving, at the one or more computer systems, information allowing the pending change data to update the data stored in the first database via a user interface generated using the same model view controller configured to present a second view of the production data stored in the first database merged with the pending change data from the second database, the second view including an indication of pending changes including one or more visual representations of changes made to the data stored in the database by the pending change data; and updating the data stored in the first database using the pending change data stored in the second database in response to the information allowing the pending change data to update the data stored in the first database.

2. A computer-implemented method according to claim 1, further comprising:

storing version information with each update of the data.

3. A computer-implemented method according to claim 2, wherein:

storing the a difference between the updated data and the data stored in the first database as pending change data in a second database comprises receiving an indication of a user approving the update of the data stored in the first database using the updated data.

4. A computer-implemented method according to claim 1, wherein:

the stored data is stored across multiple datastores.

5. A computer-implemented method according to claim 4, wherein:

the pending change data is stored in a virtual layer over the stored data across the multiple datastores.

6. A computer-implemented method according to claim 1, wherein:

the pending change data is stored with respect to the stored data based on the 4 context of the pending change data.

7. A system for managing updates to stored data, comprising:

a processor; and a memory device storing instructions that, when executed by the processor, cause the processor to:

receive a request to update data stored in a first database via a user interface generated using a model view controller configured to present a first view of production data stored in the first database;

update the data stored in the first database using updated data corresponding to the request in response to applying the updated data to the production data in the first database when the model view controller determines that a change to the data stored in the first database by the updated data does not require approval;

store a difference between the updated data and the data stored in the first database as pending change data in a second database when the model view controller determines that a change to the data stored in the first database by the updated data does require approval;

receive information allowing the pending change data to update the data stored in the first database via a user interface generated using the same model view controller configured to present a second view of the production data stored in the first database merged with the pending change data from the second database, the second view including an indication of pending changes including one or more visual representations of changes made to the data stored in the database by the pending change data; and update the data stored in the first database using the pending change data stored in the second database in response to the information allowing the pending change data to update the data stored in the first database.

8. A system according to claim 7, wherein the memory device further includes instructions that, when executed by the processor, cause the processor to:

store version information with each update of the data.

9. A system according to claim 7, wherein the memory device further includes instructions that, when executed by the processor, cause the processor to:

store the pending change data in a virtual layer over the stored data across multiple datastores.

10. A system according to claim 7, wherein the memory device further includes instructions that, when executed by the processor, cause the processor to:

store the pending change data with respect to the data stored in the first database based on the context of the pending change data.

11. A non-transitory computer-readable medium including computer-executable instructions for managing updates to stored data, the non-transitory computer-readable medium comprising:

instructions for receiving a request to update data stored in a first database via a user interface generated using a model view controller configured to present a first view of production data stored in the first database;

instructions for updating the data stored in the first database using updated data corresponding to the request in response to applying the updated data to the production data in the first database when the model view controller determines that a change to the data stored in the first database by the updated data does not require approval;

instructions for storing a difference between the updated data and the data stored in the first database as pending change data in a second database when the model view controller determines that a change to the data stored in the first database by the updated data does require approval;

instructions for receiving information allowing the pending change data to update the data stored in the first database via a user interface generated using the same model view controller configured to present a second view of the production data stored in the first database merged with the pending change data from the second database, the second view including an indication of pending changes including one or more visual representations of changes made to the data stored in the database by the pending change data; and instructions for updating the data stored in the first database using the pending change data stored in the second database in response to the information allowing the pending change data to update the data stored in the first database.

12. A non-transitory computer-readable medium according to claim 11 further comprising:

instructions for storing version information with each update of the data.

13. A non-transitory computer-readable medium according to claim 11 further comprising:

instructions for storing the pending change data in a virtual layer over the stored data across multiple datastores.

14. A non-transitory computer-readable medium according to claim 11 further comprising:

instructions for storing the pending change data with respect to the data stored in the first database based on the context of the pending change data.

* * * * *

UNITED STATES PATENT AND TRADEMARK OFFICE
CERTIFICATE OF CORRECTION

PATENT NO. : 8,645,329 B2
APPLICATION NO. : 12/476497
DATED : February 4, 2014
INVENTOR(S) : Gopalakrishnan It is certified that error appears in the above-identified patent and that said Letters Patent is hereby corrected as shown below:

In the Claims

In column 14, line 41, in Claim 3, delete "the a" and insert -- a --, therefor.

Signed and Sealed this
Fifteenth Day of July, 2014

Michelle K. Lee
*Deputy Director of the United States Patent and Trademark Office*